Patented May 12, 1931

1,805,382

UNITED STATES PATENT OFFICE

KARL STREITWOLF, OF FRANKFORT-ON-THE-MAIN, AND ALFRED FEHRLE, OF BAD-SODEN, GERMANY, ASSIGNORS TO WINTHROP CHEMICAL COMPANY, INC., OF NEW YORK, N. Y., A CORPORATION OF NEW YORK

ARSENOBENZIMIDAZOLONS

No Drawing. Application filed November 17, 1927, Serial No. 234,034, and in Germany December 2, 1926.

The present invention relates to arsenobenzimidazolons.

In U. S. P. 1,674,368 there is described a process for preparing N-substituted benzimidazolon-arsonic acids.

We now have found that the arseno compounds, obtainable from the said arsonic acids by reducing them in the usual manner, when administered per os are by far superior, as regards their efficacy, to the hitherto known arseno compounds which are administered by the same way. Moreover, the new preparations have a considerably greater stability than the arsenobenzene compound best known as 3.3'-diamino-4.4'-dihydroxyarsenobenzene. They possess the general formula:

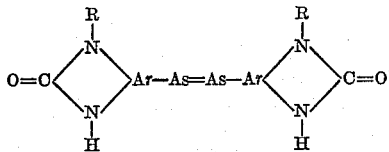

wherein R stands for alkyl or alkylene and Ar for a benzene nucleus.

The following example serves to illustrate our invention, but it is not intended to limit it thereto:

360 grams of benzmethylimidazolonarsonic acid, obtainable by the process described in the aforesaid U. S. Patent 1,674,368, are dissolved in 3,94 liters of water and 170 ccm. of caustic soda solution (40° Bé.). This solution is added to 2,020 kilograms of hydrosulfite in 9,1 liters of water and the whole is heated for about 2 hours to 65° C. to 70° C., while stirring. The lemon-colored arseno compound is separated by suction, washed with water and the resulting preparation is dried in a vacuum. It possesses the most probable formula:

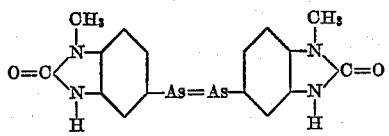

In an analogous manner by reducing 385 grams of benzpropylimidazolonarsonic acid or 382 grams of benzallylimidazolonarsonic acid (both acids being obtainable by the process described in the aforementioned U. S. patent) and working under the same conditions, there are obtainable the arsenobenzpropylimidazolon and the arseno-benzallylimidazolon respectively.

We claim:

1. As new products, the arsenobenzimidazolones of the formula:

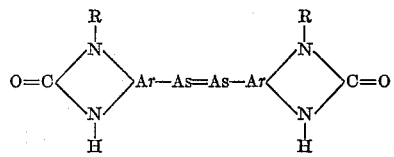

wherein R stands for alkyl or alkylene and Ar for a benzene nucleus.

2. As a new product, the 3.4.3'.4'-(4.4'-dimethyl) bisimidazolone-arsenobenzene of the formula:

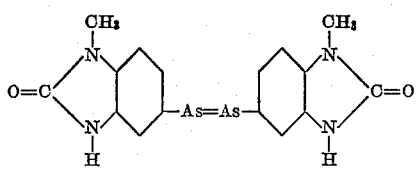

forming a yellow powder which is insoluble in water, acids and alkalies.

In testimony whereof, we affix our signatures.

DR. KARL STREITWOLF.
DR. ALFRED FEHRLE.